July 26, 1966  L. MAXWELL-HOLROYD  3,262,284
UNIVERSAL JOINTS
Filed Aug. 4, 1964

INVENTOR.
LESLIE MAXWELL-HOLROYD

United States Patent Office 3,262,284
Patented July 26, 1966

3,262,284
UNIVERSAL JOINTS
Leslie Maxwell-Holroyd, Sutton Coldfield, England, assignor to B.R.D. Company Limited, Aldridge, England, a British company
Filed Aug. 4, 1964, Ser. No. 387,334
4 Claims. (Cl. 64—17)

This invention relates to universal joints of the Hooke's type, such as are used for the propeller shaft drive of a motor vehicle in which a driving yoke is coupled to a driven yoke through the intermediary of a coupling member, needle rollers being disposed between the arms of the coupling member and bearing cups which are carried by the yokes.

The invention also relates to universal joints of the double Hooke's type in which a driving yoke is coupled to a driven yoke through the intermediary of a pair of primary coupling members, one coupled to each yoke and a secondary coupling member which connects the two primary coupling members.

With such a joint it is necessary to provide a sealing means in order to cover the gap between the inner end of each bearing cup and the adjacent part of the corresponding arm or trunnion of the coupling member in order to prevent the escape of lubricant from the joint and the entry of dirt into the joint and the object of the present invention is to provide universal joints of the Hooke's type and double Hooke's type having improved sealing means.

The invention is illustrated by way of example in the accompanying drawings in which.

Figure 1:
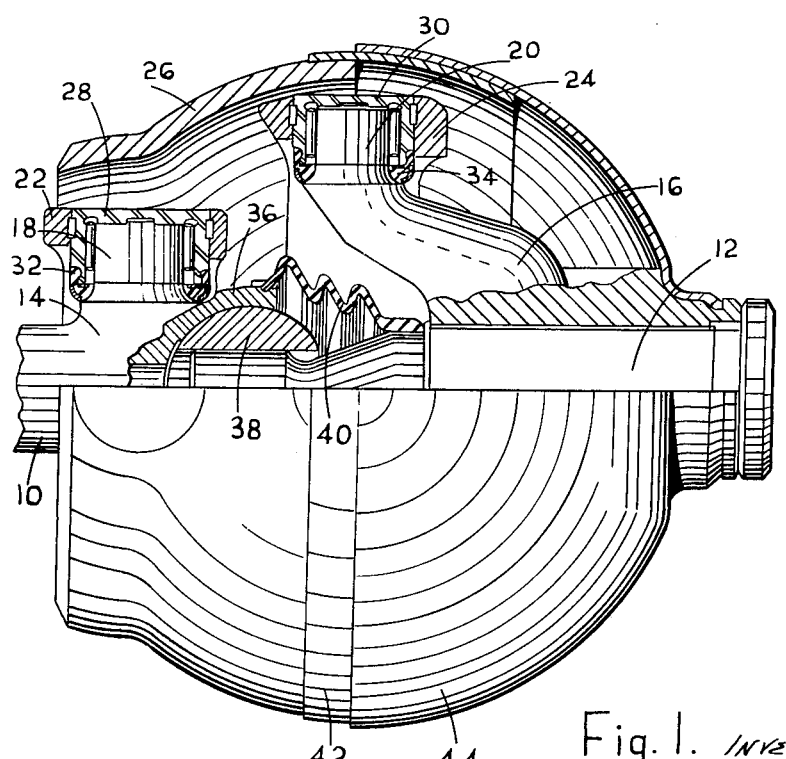
FIGURE 1 is a part sectional view of a double Hooke's joint.

The double Hooke's joint shown in FIGURE 1 connects a driving shaft 10 which is adapted to be supported in a bearing (not shown) connected to the chassis of a motor vehicle and a driven shaft 12 connected to the wheel of the vehicle (not shown). Each of the shafts is provided at its contiguous end with a yoke 14 or 16, the arms of the yoke 16 on the driven shaft 12 being cranked and the arms of the yoke 14 being disposed radially of the shaft 10, each of the yokes 14 and 16 being provided at their outwardly directed ends with trunnions 18 and 20.

The double Hooke's joint includes a pair of primary coupling members 22 and 24 and a secondary coupling member 26 in the form of a shroud which partially encloses the joint. The primary coupling members 22 and 24 are in the form of rectangular rings and include a pair of diametrically opposed openings and also a pair of outwardly directed trunnions (not shown) also diametrically opposed and disposed at right angles to the openings.

In order to connect the trunnions 18 and 20 on the shafts 10 and 12 to the primary coupling members 22 and 24, the yoke 14 or 16 is inserted in the associated primary coupling member 22 or 24 with the trunnions 18 or 20 disposed in the openings of the coupling member 22 or 24. A bearing cup 28 or 30 containing needle roller bearings is then inserted from the outside of the coupling member 22 or 24 into the opening so as to be a tight frictional fit in the opening and to surround the trunnion 18 or 20. A sealing ring 32 or 34 is first engaged with the bearing cup 28 or 30 before the bearing cup is inserted in the opening of the coupling member 22 or 24.

The secondary coupling member 26 includes two pairs of diametrically opposed openings the axes of which are parallel and the trunnions on the primary coupling members 22 and 24 are inserted in these openings and bearing cups are then inserted to hold the trunnions in position.

In order to assist in centering of the shafts a centering means is also included and this consists of a spherical seating 36 formed on the end of the driving shaft 10 which is adapted to receive a spherical bearing 38 on the driven shaft 12, this bearing 38 being keyed to the end of the driven shaft 12. In order to effect lubrication of the centering means a longitudinally extending bore (not shown) is formed in the driving shaft 10, lubricant is fed into the bore and a spring-loaded wick is inserted into the bore, this wick bears against the spherical bearing on the driven shaft so as to effect lubrication of the centering means.

A gaiter 40 is secured to the spherical seating 36 and to the driven shaft 12 to prevent dust and dirt from entering the centering means and to prevent loss of lubricant and the joint is contained within a casing defined by the secondary coupling member 26, a cover member 42 is secured to the secondary coupling member 26 and a further cover member 44 secured to the driven shaft 12 so as to partially enclose the cover member 42.

Figure 2:
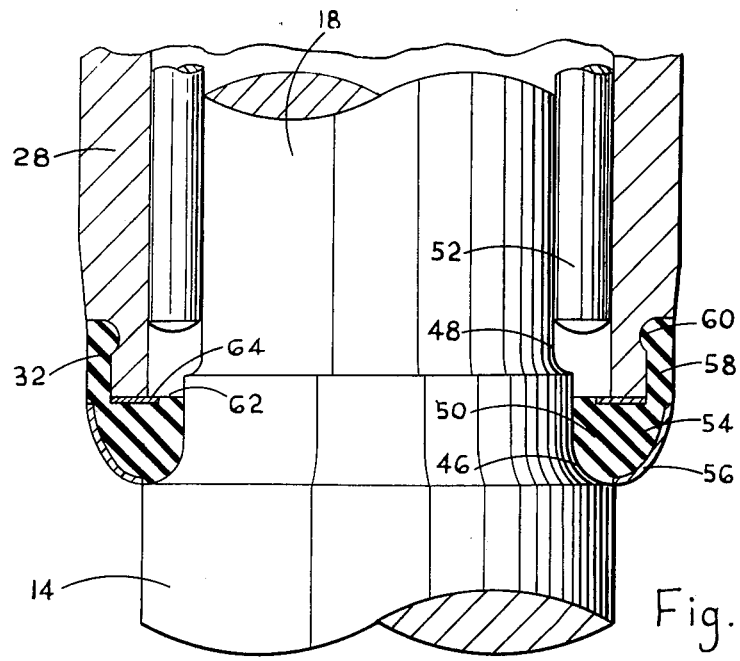
FIGURE 2 is an enlarged view showing the arrangement of the coupling between one trunnion on one of the yokes and the associated bearing cup.

The arrangement of the coupling between one trunnion 18 on the yoke 14 of the driving shaft 10 is shown in detail in FIGURE 2. A pair of outwardly directed shoulders 46 and 48 are formed on the trunnion and the inner shoulder 46 is adapted to receive the body 50 of the sealing ring 32 and the outer shoulder is adapted to limit axial inward movement of needle rollers 52 which are disposed between the trunnion 18 and the bearing cup 28. Each shoulder 46 and 48 presents a concave outer surface the inner shoulder 46 being of substantially greater radial dimension than the outer shoulder 48.

The sealing ring 32 which is supported by the inner shoulder 46 is formed as a rubber ring and includes a body portion 50 which is shaped to provide a curved inner surface whose radius of curvature corresponds to the radius of concavity of the inner shoulder 46 so that the sealing ring 32 is a sealing fit with the trunnion 18. The external diameter of the sealing ring 50 is greater than the diameter of the inner shoulder 46 at its radial outer edge so that part 54 of body portion 50 of the sealing ring 32 projects radially outwardly beyond the trunnion 18 and the outer peripheral surface of this projecting portion 54, which is also of curved form, has moulded integrally therewith an annulus 56 of metal the outer peripheral surface of which is flush with the outer peripheral surface of the sealing ring 32. The annulus 56 serves to reinforce the sealing ring 32.

Projecting outwardly from the sealing ring 32, considered in a direction axially of the trunnion 18, is a single integral flange 58 which extends from the radially outwardly projecting portion 54 of the body 50 of the sealing ring 32, this flange 58 being formed adjacent its outer end with an annular inwardly projecting rib 60. That portion 62 of the body 50 of the sealing ring 32 which is disposed facing the end of the bearing cup 28 is substantially flat and is provided with an annular seating which receives a flat washer 64 of nylon or like low friction material.

The inner end of each bearing cup 28, being the end which is adapted to be disposed adjacent the shoulders 46 and 48 of the trunnion 18, is shaped externally to provide an annular seating in which the aforesaid inwardly directed annular rib 60 on the flange 58 of the sealing ring 32 may engage so as to positively locate the sealing ring 32 with respect to the bearing cup 28.

The sealing ring provides an effective seal against the escape of lubricant from the joint and also against the ingress of dirt, water and other foreign matter into the joint and the provision of the metal reinforcement 56 adds to the strength and permanence of the seal.

The invention is equally applicable to Hooke's joints as well as double Hooke's joints and in this case each arm of the coupling member of the Hooke's joint is formed with shoulders as described above and a sealing ring of the same configuration is employed for the joint between the arm of the coupling member and the bearing cup engaged in the yoke of the driving or driven shaft.

What I then claim is:

1. A Hooke's joint in which the sealing means between a bearing cup and a trunnion includes a sealing ring of elastomeric material comprising—
    (a) a body portion having:
        (1) a curvilinear inner surface which bears against and is supported by a shoulder of corresponding curvilinear form provided on the trunnion, and
        (2) a flat surface which is directed towards the adjacent end face of the bearing cup and is formed with an annular seating in which a washer is disposed in abutting engagement with the end face of the bearing cup,
    (b) an annular flange portion surrounding said flat surface and projecting therefrom, the inner face of said flange portion being in contact with the outer surface of the adjacent end portion of the bearing cup, and
    (c) an inwardly directed rib at the end of said flange portion remote from said body portion and said rib engaging in a circumferentially extending groove formed in the outer surface of the cup,
        the cross section of said groove corresponding to that of said rib and a seal path of generally labyrinthine form being defined between the outer surface of said bearing cup on the one hand and the washer, the inner face of the flange portion and the inwardly directed rib on the other hand.

2. A Hooke's joint according to claim 1 which includes a metal reinforcing ring molded integrally with the outer peripheral surface of the body portion of the sealing ring.

3. A double Hooke's joint which includes:
    (1) a driven yoke,
    (2) a driving yoke,
    (3) a primary coupling member connected to each yoke, and
    (4) a secondary coupling member pivotally interconnecting the primary coupling members,
    (5) the pivotal connection between each yoke and each primary coupling member and between the secondary coupling member and each primary coupling member including a pair of trunnions engaging in bearing cups and sealing means being provided between each bearing cup and trunnion,
    (6) said sealing means including a sealing ring of elastomeric material comprising—
        (a) a body portion having:
            (1) a curvilinear inner surface which bears against and is supported by a shoulder of corresponding curvilinear form provided on the trunnion,
            (2) a flat surface which is directed towards the adjacent end face of the bearing cup and is formed with an annular seating in which a washer is disposed in abutting engagement with the end face of the bearing cup,
        (b) an annular flange portion surrounding said flat surface and projecting therefrom, the inner face of said flange portion being in contact with the outer surface of the adjacent end portion of the bearing cup, and
        (c) an inwardly directed rib at the end of said flange portion remote from said body portion, said rib engaging in a circumferentially extending groove formed in the outer surface of the cup,
            the cross section of said groove corresponding to that of said rib and a seal path of generally labyrinthine form being defined between the outer surface of said bearing cup on the one hand and the washer, the inner face of the flange portion and the inwardly directed rib on the other hand.

4. A double Hooke's joint according to claim 3 which includes a metal reinforcing ring molded integrally with the outer peripheral surface of the body portion of each sealing ring.

References Cited by the Examiner

UNITED STATES PATENTS

| | | | |
|---|---|---|---|
| 238,454 | 3/1881 | State. | |
| 2,078,739 | 4/1937 | Slaght | 64—17 |
| 2,133,176 | 10/1938 | Parent | 64—17 |
| 2,896,433 | 7/1959 | Hempel | 64—17 |
| 2,991,634 | 7/1961 | Daley | 64—21 |
| 3,174,813 | 3/1965 | Selz | 64—17 X |

FOREIGN PATENTS 739,655   11/1955   Great Britain.

FRED C. MATTERN, JR., Primary Examiner.

HALL C. COE, Examiner.